Patented Sept. 16, 1941

2,256,380

UNITED STATES PATENT OFFICE 2,256,380

YARN CONDITIONING

Joseph B. Dickey, Rochester, N. Y., assignor to Eastman Kodak Company, Rochester, N. Y., a corporation of New Jersey No Drawing. Application September 18, 1940, Serial No. 357,302

7 Claims. (Cl. 28—1)

This invention relates to new surface-active agents and more particularly to the preparation and use as wetting, dispersing, emulsifying and sizing agents, textile assistants and the like, of phosphoric and thiophosphoric acid esters of hydroxy ethers and hydroxy ether esters of polyglucose derivatives such as cellulose, starch, dextrin and similar materials.

As is well known, surface-active agents have many important uses in the textile and allied industries. Typical uses of such compounds are as wetting and cleansing agents, ingredients of scour baths employed for the removal of grease or lubricants and similar agents from natural or synthetic yarns, as textile assistants and as dispersing agents in the manufacture of many different yarn treating compositions, including those intended for the deelectrification, lubrication and softening of natural and synthetic yarns. Most of these agents have the common property of acting primarily as surface tension reducers, that is, they have the power of spreading a given liquid on a surface with respect to which it is normally incompatible. For example, water is incompatible with a cellulose acetate surface to the extent that it does not readily wet it, but tends to form droplets if in contact with such a surface. If, however, a surface active agent is dissolved in the water, the surface tension is broken and the liquid can readily spread out over and "wet" the normally incompatible surface.

Another property of these agents which is directly or indirectly connected with their surface-tension reducing properties is their ability to break up into small substances which would normally remain suspended in large aggregates in a given liquid. Thus a dye may be dispersed in water or other liquid by simply adding a substance which tends to break the dye aggregates into smaller particles which are thus more widely distributed in the suspending liquid. This dispersing action is also taken advantage of in the use of such compounds as emulsifying agents. In this case, the agent may break up droplets of oil into much smaller aggregates and disperse them widely in a normally incompatible suspending liquid such as water.

This invention has as an object to provide a new type of surface-active agents which have the properties of functioning as wetting, dispersing, and emulsifying agents. Another object is to provide a new type of wetting agents which can be employed as textile assistants, dye assistants, yarn lubricants, yarn sizing agents and for various other allied purposes. Other objects will appear hereinafter.

These objects are accomplished by the following invention which resides in the preparation and use of an entirely new class of polyglucose derivatives prepared by reacting hydroxy alkylated derivatives of cellulose, starch, dextrin, etc., with suitable phosphating agents such as phosphoric anhydride, phosphorus pentasulfide, phosphoric acid, phosphorus oxychloride, phosphorus thiochloride and their derivatives, or with phosphiting agents such as phosphorus acid, pyrophosphorus acid, phosphorus trichloride, a phosphorus dichloride monoester, a phosphorus monochloride diester

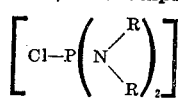

dichlorophosphamide, chlorodiphosphamide

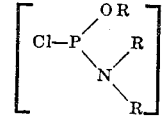

a chlorophosphamide ester $$\left[ Cl-P\diagdown\begin{array}{c}OR\\R\\N\diagdown R\end{array}\right]$$

The invention also contemplates the use of salts of the above compounds which may be prepared by reacting appropriate bases with the compounds in question as will be more fully set forth by the illustrative examples given hereinafter.

As bases I may use for example sodium, potassium, ammonium, calcium and magnesium hydroxides, ethanolamine, diethanolamine, triethanolamine, beta-hydroxy propanol amine, glucose amine, diethylcyclohexylamine, cyclohexylamine, oleyl amine, cetyl amine, ditetrahydrofurfuryl amine, morpholine, ethylene diamine, tributylamine, beta-hydroxy-beta-ethoxy ethylamine, trimethyl benzyl ammonium hydroxide, etc.

In addition to hydroxylated ether groups there may be present substituted and unsubstituted ether groups such as alkyl, aryl and heterocyclic groups. Likewise, in addition to ether groups there may be ester groups, such as acetate, propionate, butyrate, benzoate, carbonate, furoate, tetrahydrofuroate, sulfite and the like.

In the following examples and description, I have set forth several of the preferred embodiments of my invention, but they are included merely for purposes of illustration and are not intended to be a limitation thereof.

PREPARATION OF COMPOUNDS

The compounds of the type above referred to may be prepared in accordance with procedures well known to those skilled in the art. Illustrative examples of preparation of typical compounds are as follows:

*Example 1*

182 gm. of beta-hydroxy ethylated starch containing one beta-hydroxy ethyl group per glucose residue are treated in pyridine with 160 gm. of phosphorus oxychloride at 0° and the reaction is completed by warming. Most of the pyridine is removed under reduced pressure and the residue is treated with aqueous sodium carbonate. The reaction product has the formula:

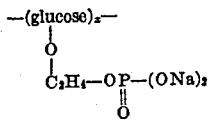

*Example 2*

227 gm. of beta-hydroxy ethyl dextrine containing two beta-hydroxy ethyl groups per glucose unit are treated as described in Example 1 with 182 gm. of PSCl₃ and the potassium salt prepared. The reaction product has the formula:

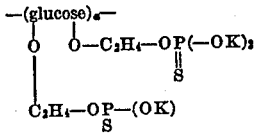

In a similar manner I may prepare:

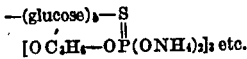

*Example 3*

182 gm. of cellulose containing one beta-hydroxy ethyl group per glucose unit are treated with one mole of phosphorus oxychloride and the triethanolamine salt is prepared. The reaction product has the formula:

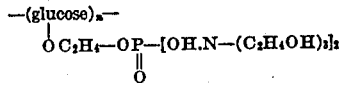

*Example 4*

215 gm. of starch containing one acetyl group and one gamma-hydroxy propyl group to every two glucose residues (these groups may or may not be on the same glucose residue) are treated in a mixture of dioxane and pyridine with 191 gm. of

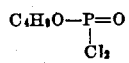

and the sodium salt prepared as previously described. The reaction product has the formula:

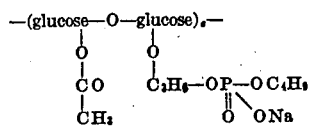

*Example 5*

280 gm. of dextrine containing one propionyl and one beta-hydroxy ethyl group per glucose residue are treated with 35.9 gm. of

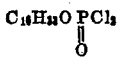

as described in Example 4 and the cetyl amine salt is prepared. The reaction product has the formula:

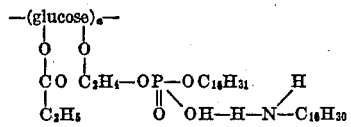

*Example 6*

323 g. of a cellulose derivative containing one valeryl group and one beta-hydroxy propyl group are treated with 190 g. of

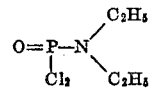

in dioxane and pyridine. The dimethyl cyclohexylamine salt is prepared. The reaction product has the formula:

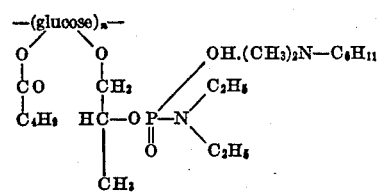

*Example 7*

381 g. of a starch derivative containing one lauryl and two beta-hydroxy ethyl groups per glucose unit are reacted with two moles of

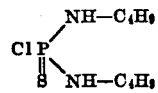

in a suitable basic medium. The reaction product has the formula:

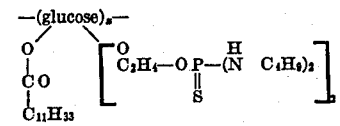

*Example 8*

403 g. of a dextrin derivative containing one stearyl and two beta-hydroxy ethyl groups per glucose unit are reacted in a mixture of dimethylamine cyclohexyl amine and dioxane with two moles of OPCl₃. The morpholine salt is prepared.

*Example 9*

262 g. of a cellulose derivative containing one methyl and one glyceryl group per glucose unit are treated with one mole of PSCl₃ as described in Example 1 and the tetramethyl ammonium hydroxide salt prepared. The free hydroxy group in the side chain may be reacted with a second mole of PSCl₃ or POCl₃ or esterfied with suitable anhydride.

*Example 10*

350 g. of a starch derivative containing one benzyl or phenyl and one o-hydroxy cyclohexyl group per glucose unit are reacted with one mole of phosphorus oxychloride and the trimethylbenzylammonium hydroxide salt prepared. The reaction product has the formula:

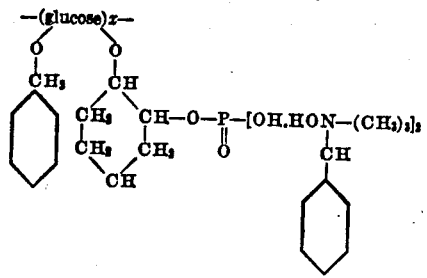

Example 11

400 g. of a derivative of dextrin containing one ethyl, beta-hydroxy ethyl or phthalate group are treated with one mole of POCl₃ as previously described and the potassium salt prepared. The reaction product has the formula:

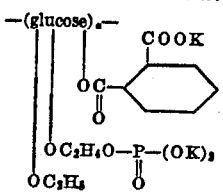

Example 12

One mole of a cellulose derivative containing one oleyl and two beta-hydroxy ethyl groups is reacted with one mole of

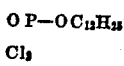

and the ammonium salt prepared. The reaction product has the formula:

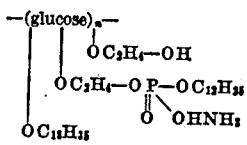

The free hydroxyl group may be esterified.

Example 13

One mole of a starch derivative containing two to three —(OC₂H₄)₁,₂,₃ etc.—CH groups is reacted with one, two or three phosphating compounds and any desired salt prepared. Freehydroxy groups may be acetylated, etc. The reaction product has the probable formula:

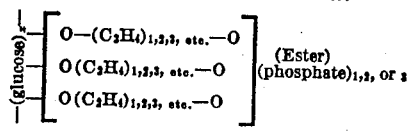

Example 14

One mole of a dextrin derivative containing one p-nitro phenyl and one beta-hydroxy ethyl group per glucose unit is reacted with phosphorus pentasulfide in dioxane, pyridine, etc. and any suitable salt prepared. The reaction product has the formula:

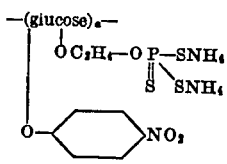

The nitro group may be reduced, diazotized and couples to give dyes.

Example 15

One mole of a cellulose derivative containing 1-pyridine and one —(OC₂H₄)₁,₂,₃, etc.—OH, group is reacted with one mole of

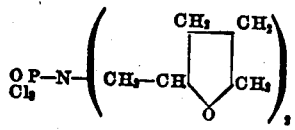

and the ditetrahydrofurfuryl amine salt prepared. The reaction product has the formula:

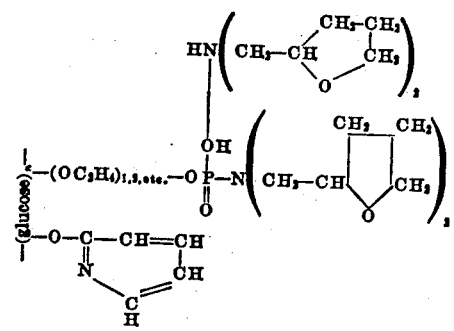

Example 16

One mole of glucose mono-beta-hydroxy ethyl ether is treated in pyridine with one mole of phosphorous trichloride in the cold. The reaction is completed by warming. Then 1.5 moles of an aqueous sodium carbonate solution is added and the excess pyridine is removed under reduced pressure. The product is glucose mono-beta-phosphito ethyl ether. Any desired salt of the phosphite such as the sodium, potassium, ammonium, diethyl-cyclohexylamine, triethanolamine, tetraethylammonium hydroxide etc. may be prepared. In place of the glucose mono-beta-hydroxy ethyl ether I may use the di-beta-hydroxy propyl,( the triglyceryl, tetra-beta-hydroxy ethoxy ethyl etc.

Example 17

One mole of the di-beta-hydroxy propyl ether of dextrine is reacted as in Example 16 with two moles butoxy phosphorous dichloride. The resulting acid can be wholly or partially neutralized with any desired organic or inorganic base. In place of the above ether I may use any of the types indicated in the specification.

Example 18

One mole of tri-beta-hydroxy-beta-ethoxy-beta-ethoxy ethyl cellulose is reacted as in Example 16 with three moles of

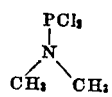

The product is worked up as previously described.

As indicated above, the compounds prepared as described in the preceding examples may be used in a rather wide variety of textile and allied processes. These materials find particular use as wetting, dispersing and emulsifying agents, as textile assistants, dye assistants, sizing agents, yarn lubricants and various other uses. The following examples will illustrate certain of such uses to which these compounds may be put.

Dye Dispersing

Example 19

Two pounds of p-nitrobenzene azoethyl-beta-hydroxy ethyl aniline are ground in a suitable mill with one pound of sodium phosphito propyl glucose and placed in 200 gallons of water heated to 60–85° C. 100 pounds of a cellulose acetate crepe fabric is entered in this bath and dyed deep red shades.

Example 20

Two pounds of p-nitrobenzene azoethyl-beta-hydroxy ethyl aniline are ground in a suitable mill with one pound of sodium biphosphito propyl glucose and placed in 200 gallons of water heated to 60–85° C. 100 pounds of a cellulose acetate fabric is entered in this bath and dyed a deep red shade as in the preceding example.

Lubrication

Example 21

A cellulose acetate knitting yarn is treated by applying thereto starch oleate-beta-phosphito-ethyl diethyl cyclo-hexylamine salt by means of an applicator roll. This compound may be prepared by treating starch oleate-beta-hydroxyl ethyl ether with one mole of $PCl_3$ in accordance with the procedure outlined above. This same treatment is of value when applied to cut staple yarn.

Sizing

Example 22

A skein of viscose type rayon is immersed in an aqueous bath of the compound described in Example 11. After thorough soaking, the skein is removed and dried. By this means a tough surface coating is applied to the yarn which facilitates the subsequent use of the yarn in weaving or knitting operations.

Example 23

Cellulose acetate is treated with an emulsion prepared from blown neat's-foot oil and the product of Example 13. After thorough soaking the skein is removed and dried.

Printing

Example 24

A fabric composed of cellulose acetate and dyed as described in Example 19 is printed with a discharge paste made up as follows:

| | Parts |
|---|---|
| Product of Example 13 | 30 |
| Water | 20 |
| Diethylene glycol or tetrahydrofurfuryl alcohol | 20 |
| Sodium sulfoxylate | 30 |

The fabric is then heated with steam at atmospheric pressure.

Example 25

A cellulose acetate fabric dyed as described in Example 19 is printed with a discharge paste made up as follows:

| | Parts |
|---|---|
| Sodium phosphito propyl glucose | 30 |
| Water | 20 |
| $\beta,\beta'$ hydroxy ethyl sulfide | 20 |
| Sodium sulfoxylate | 10 |
| Zinc | 10 |

What I claim is:

1. A yarn conditioning composition containing as its essential conditioning component a surface-active agent consisting of a compound prepared by reacting a hydroxy alkylated derivative of a carbohydrate with an agent selected from the group consisting of phosphating and phosphiting agents.

2. The process of conditioning yarn which comprises applying thereto a compound prepared by reacting a hydroxy alkylated derivative of a carbohydrate with an agent selected from the group consisting of phosphating and phosphiting agents.

3. The process of conditioning yarn composed of or containing an organic derivative of cellulose which comprises applying thereto a compound prepared by reacting a hydroxy alkylated derivative of a carbohydrate with an agent selected from the group consisting of phosphating and phosphiting agents.

4. The process of conditioning yarn composed of or containing cellulose acetate which comprises applying thereto a compound prepared by reacting a hydroxy alkylated derivative of a carbohydrate with an agent selected from the group consisting of phosphating and phosphiting agents.

5. Textile yarns amenable to textile operations including knitting, weaving, spinning, and the like, impregnated with a lubricating and softening composition containing as its essential lubricating and softening component a compound prepared by reacting a hydroxy alkylated derivative of a carbohydrate with an agent selected from the group consisting of phosphating and phosphiting agents.

6. Textile yarns composed of or containing organic derivatives of cellulose amenable to textile operations including knitting, weaving, spinning, and the like, impregnated with a lubricating and softening composition containing as its essential lubricating and softening component a compound prepared by reacting a hydroxy alkylated derivative of a carbohydrate with an agent selected from the group consisting of phosphating and phosphiting agents.

7. Textile yarns composed of or containing cellulose acetate amenable to textile operations including knitting, weaving, spinning, and the like, impregnated with a lubricating and softening composition containing as its essential lubricating and softening component a compound prepared by reacting a hydroxy alkylated derivative of a carbohydrate with an agent selected from the group consisting of phosphating and phosphiting agents.

JOSEPH B. DICKEY.